United States Patent [19]

Hsu et al.

[11] Patent Number: 5,076,633
[45] Date of Patent: Dec. 31, 1991

[54] AUTOMATIC SUN SCREEN FOR MOTOR VEHICLES

[76] Inventors: Chi-Hsueh Hsu, 4F, No. 144, Chu Lin Road, Yung Ho, Taipei; Ping-Chang Chiu, No. 26-2, Fu Te 2nd Road, Kaohsiung; Jong-Yes Shyu, 4F, No. 144, Chu Lin Road, Yung Ho, Taipei, all of Taiwan

[21] Appl. No.: 653,234

[22] Filed: Feb. 11, 1991

[51] Int. Cl.⁵ .................................................. B60J 3/02
[52] U.S. Cl. .................................... 296/97.4; 296/97.8
[58] Field of Search ............... 296/97.4, 97.8, 97.1, 296/97.6, 97.9; 160/370.2, DIG. 3

[56] References Cited

U.S. PATENT DOCUMENTS

| | | | |
|---|---|---|---|
| 2,874,770 | 2/1959 | Rohr et al. | 296/97.8 X |
| 2,927,819 | 3/1960 | Johnson | 296/97.8 |
| 3,092,174 | 6/1963 | Winn | 296/97.8 X |
| 3,226,152 | 12/1965 | Reuther | 296/97.4 |
| 3,363,666 | 1/1968 | Hodgson et al. | 296/97.4 X |
| 3,584,910 | 6/1971 | Lupul | 296/97.8 X |
| 4,171,845 | 10/1979 | Hirsch | 296/97.4 |
| 4,707,018 | 11/1987 | Gavagan | 296/97.8 X |

Primary Examiner—Margaret A. Focarino
Assistant Examiner—Joseph D. Pape
Attorney, Agent, or Firm—Morton J. Rosenberg; David I. Klein

[57] ABSTRACT

An automatic sun screen for vehicles having a sun screen cylinder, a set of transmission devices, a sun screen, a stationary part, operating buttons and a power source plug characterized in that the transmission device in the left side of the sun screen cylinder can be transmitted by a motor, and the sun screen with steel spring plates in the right side of the sun screen cylinder being connected with the transmission device can be rolled up or released by the obverse and reverse movement of the motor when drivers push the operating buttons upwardly or downwardly.

3 Claims, 5 Drawing Sheets

AUTOMATIC SUN SCREEN FOR MOTOR VEHICLES

BACKGROUND OF THE INVENTION

1. Field of the Invention

This invention relates to an automatic sun screen for motor vehicles with a sun screen which may be reversibly rolled or unrolled by motor actuation. The sun screen includes a pair of spring plate members which maintain the sun screen in a substantially planar contour when unrolled.

2. Description of the Prior Art

Sun visors (7) are known in the art and are generally formed in planar contour and connected to the motor vehicle structure by movable cross bars as shown in FIG. 1. Drivers may displace the sun visors (7) commonly placed in the front, left and right windows of motor vehicles and adjust them to proper angles in order to block sun light. However, it is generally dangerous for drivers to manually displace the sun visors (7) with their hands, since the user's hands must be removed from the steering wheel. Accidents may occur when the driver's attention is diverted from road conditions.

SUMMARY OF THE INVENTION

It is an object of the present invention to provide a sun screen which is capable of being automatically rolled up or released by the driver by merely actuating a switch member.

Another object of this invention is to provide a sun screen with displaced spring plate members which maintain the sun screen in a flattened contour when the sun screen is unrolled from a sun screen housing.

According to the preferred embodiments of the present invention having these objectives, there are a number of advantages including:

1. It is a simple matter to roll up or release the sun screen so that the driver does not divert his or her attention from road conditions and minimize the possibility of accidents;

2. The sun screen with steel spring plate members is designed to allow the sun screen to maintain a planar contour at fixed angles in order not to obstruct the driver's view;

3. When the driver is not operating the motor vehicle, the sun screen may be completely released so as to completely block the sun light entering the vehicle.

DESCRIPTION OF THE PREFERRED EMBODIMENTS

Figure 1:
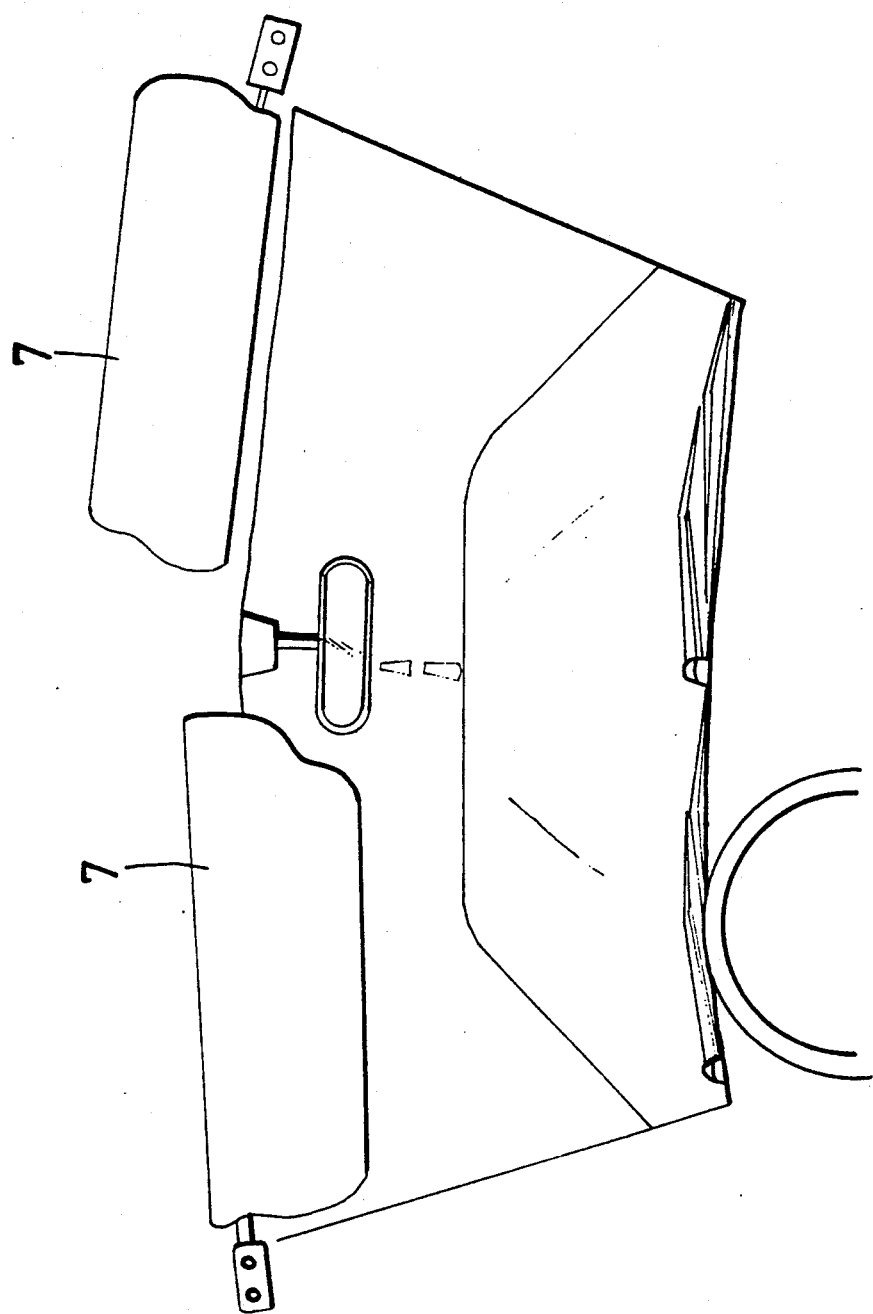
FIG. 1 is a perspective view showing the prior art.
Figure 2:
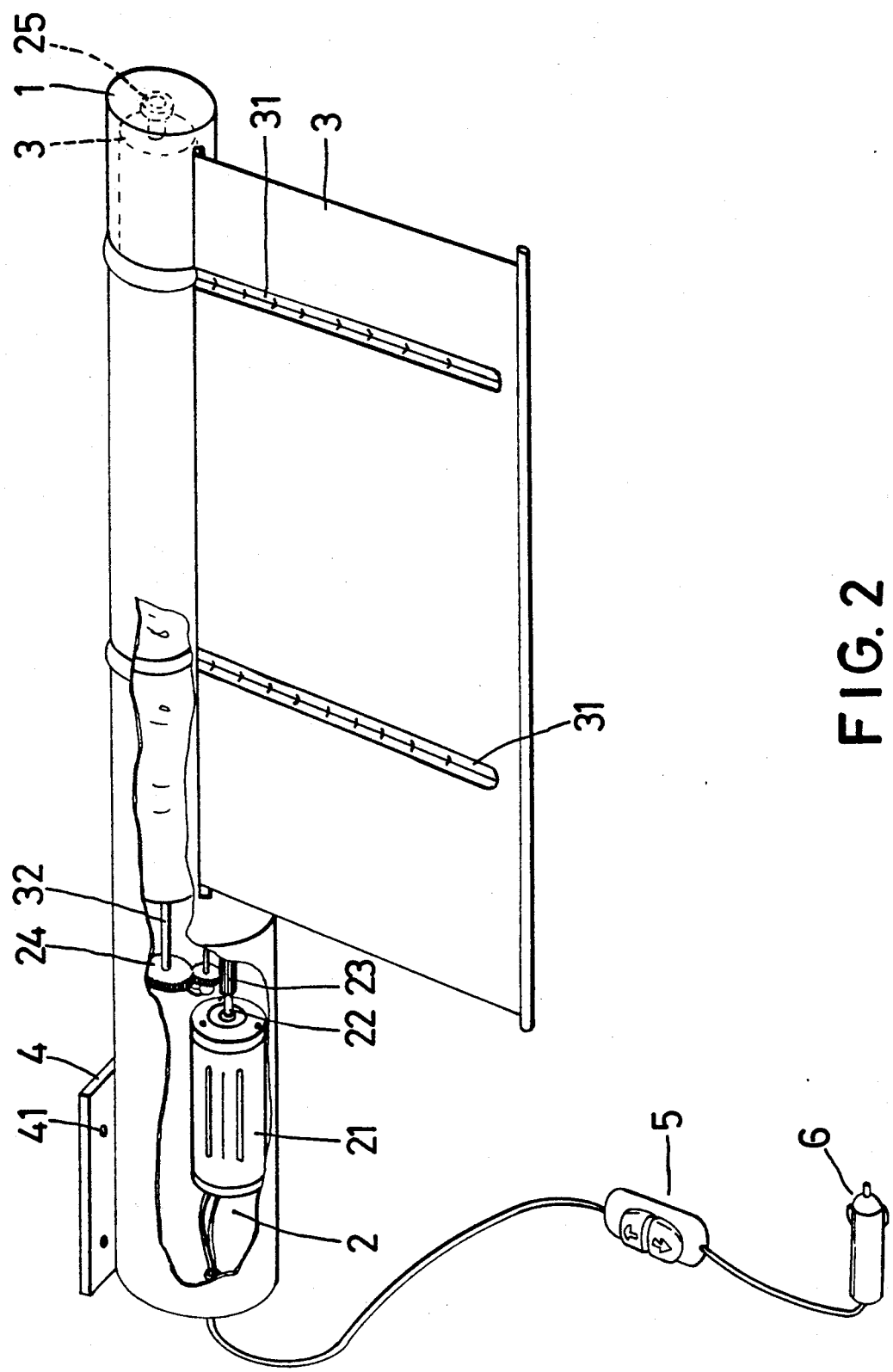
FIG. 2 is a perspective view showing the detailed internal structure of the subject invention sun screen.

As shown in FIG. 2, the present invention is directed to an automatic sun screen for motor vehicles including an elongated sun screen cylinder (1) defining a first and second internal chamber in open communication with each other and axially displaced from each other. A mechanism (2) for displacing the sun screen (3) is provided in the first chamber. The mounting plate (4) secures the sun screen cylinder (1) to the interior structure of the vehicle. An electrical plug (6) adapted to be inserted into a lighter electrical outlet of the vehicle is shown in electrically coupled relation to switch member (5).

The sun screen cylinder (1) defining a hollow cylinder includes displacement or transmission device (2) mounted in the first chamber and a sun screen (3) being capable of being reversibly displaced within the second chamber.

The displacement device (2) mounted internal the first chamber of the sun screen (1) includes a motor (21), a motor power shaft (22) coupled to a main shaft drive gear (23) and shaft driven gears (24) engaged with the main shaft drive gear (23).

The substantially planar contoured sun screen (3) is secured to and rolled around sun screen transmission shaft (32) where one end is connected to the shaft driven gears (24) and an opposing end is inserted into a ball bearing block member (25) secured to the sun screen cylinder (1). The sun screen (3) being rolled up or released on the transmission shaft (32) also includes steel spring plate members (31) displaced from each other by a predetermined distance.

The mounting plate member (4) is secured to the top of the sun screen cylinder (1) and includes holes (41) so as to allow a fixed threaded connection to the motor vehicle structure.

Operating buttons (5) control actuation of the motor (21) to permit reversible displacement of the sun screen (3). The power plug (6) electrically connects the operating buttons or switches (5) and the motor vehicle electrical system through a standard lighter outlet.

In assembly, the transmission device (2) is mounted in the first chamber of the hollow sun screen cylinder (1) as is clearly seen in FIG. 2. The sun screen (3) is combined with the transmission shaft (32) and is mounted in the second chamber of the hollow sun screen cylinder (1). The shaft drive gear (24) of the transmission shaft (32) is engaged with the main shaft drive gear (23) of the motor power shaft (22). The transmission shaft (32) is inserted into the ball bearing block (25) of the sun screen cylinder (1) to finalize the assembly of the automatic sun screen as shown in FIG. 2.

Figure 3:
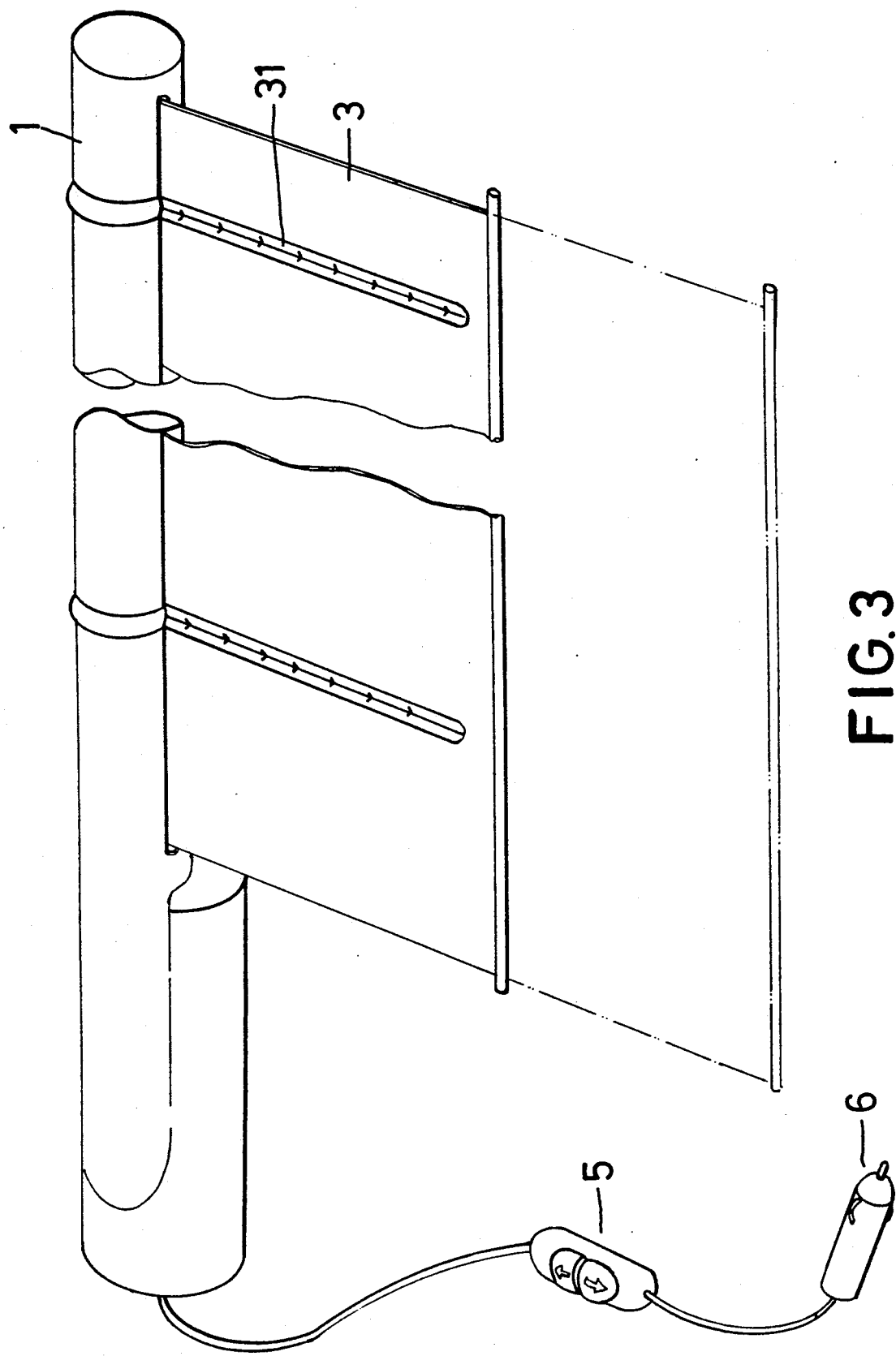
FIG. 3 is a view showing the outward appearance of the subject invention sun screen.

When operating the automatic sun screen of the present invention, as is shown in FIGS. 2 and 3, initially the power plug (6) is inserted into a socket of a standard cigarette lighter of the motor vehicle to provide an electrical path to the operating buttons (5) from the battery of the vehicle. When sun light impedes the driver's efficiency, the operating button (5) is actuated so that the motor (21) will rotate the main shaft drive gear (23) and the shaft driven gears (24) to responsively rotate transmission shaft (32) and release the sun screen (3). When the sun screen (3) is released to a proper length, the driver may release the operating button (5) and terminate the motor (21) displacement. Moreover, the driver only needs to push the operating button (5)

with one finger to reverse the motor (21) and roll up the sun screen (3) into the sun screen cylinder (1).

The steel spring plate members (31) are designed to allow the released sun screen (3) to maintain any required fixed angle for minimizing the discomfort from the sun light.

Figure 4:
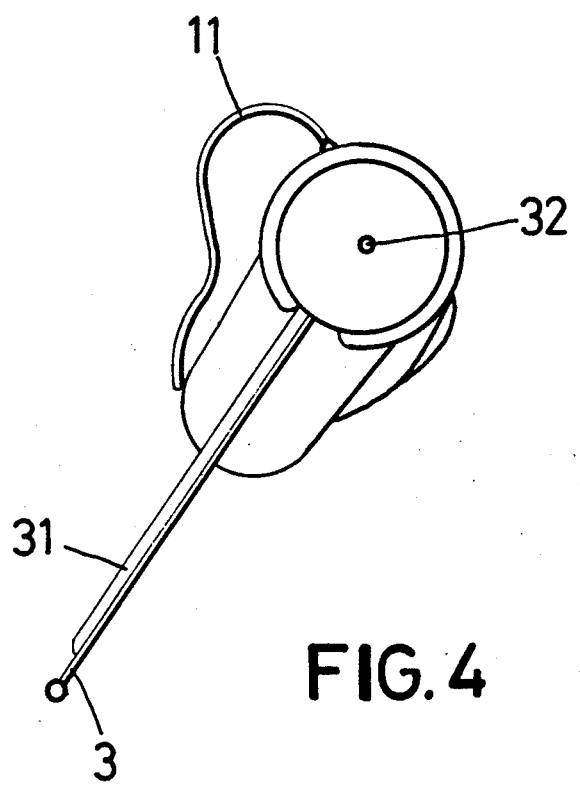
FIG. 4 is an elevational view of the subject invention showing a preferred embodiment of the invention providing a spring clip on the top of a sun screen cylinder.
Figure 5:
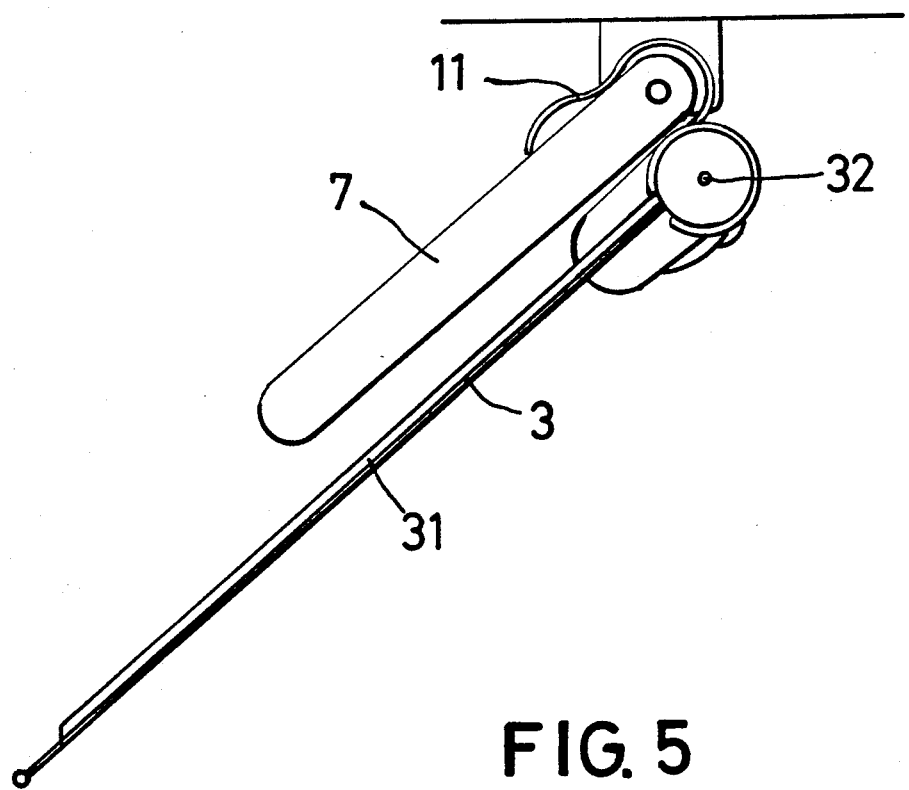
FIG. 5 is a side view showing a preferred embodiment of the invention where the sun screen is fixed on a sun visor by a spring clip; and, FIG. 6 is a view showing an embodiment of the invention where the sun screen and the sun visors are combined and fixed to the top of the front window of a motor vehicle.
Figure 6:
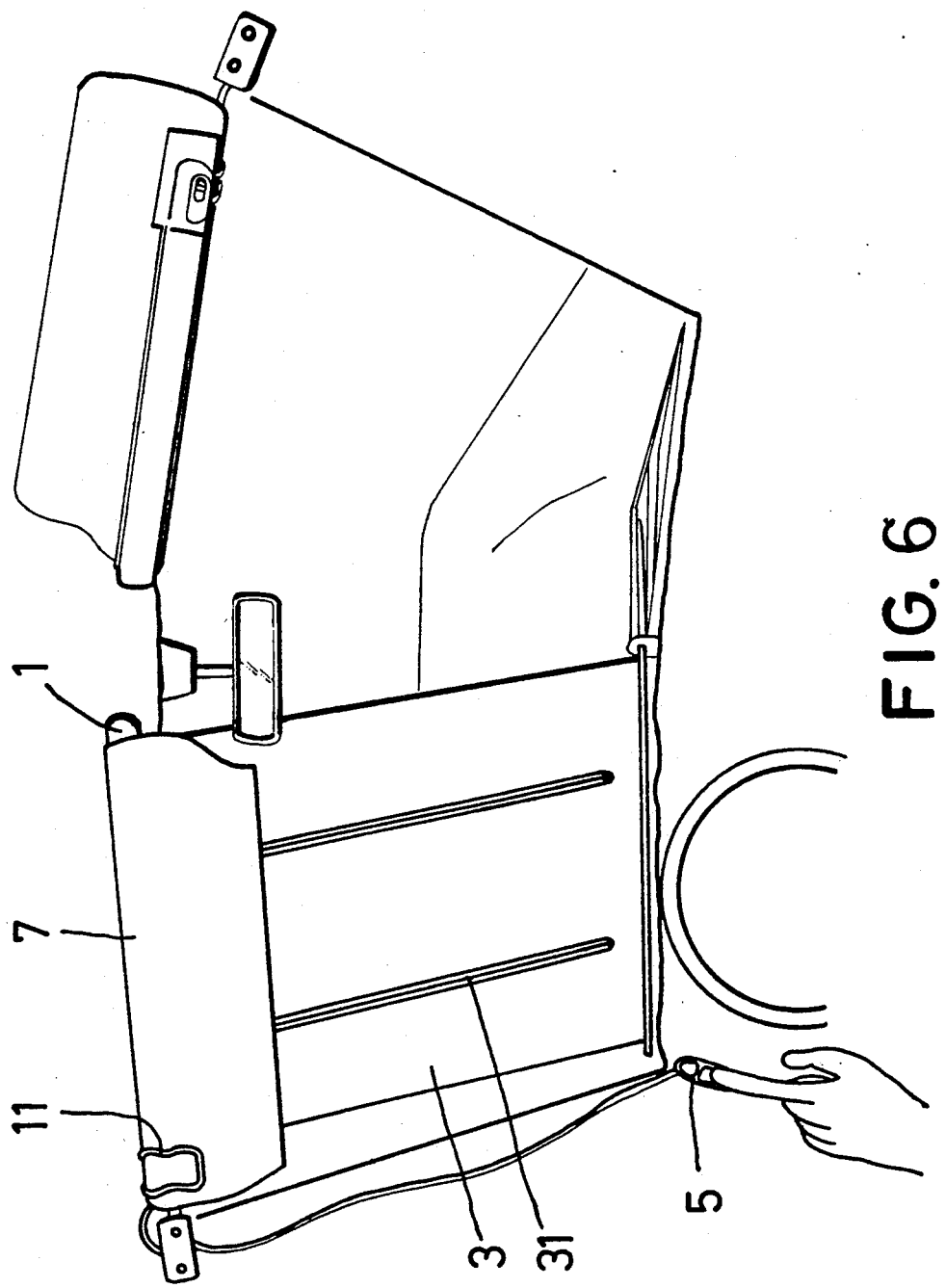

As shown in FIGS. 4, 5 and 6, drivers may also use spring clips (11) on the top of the sun screen cylinder (1) to fix the automatic sun screen of the present invention to the sun visors (7) of the motor vehicle. Moreover, because the sun screens (3) of the present invention are longer in their extended direction than the existing sun visors (7) provided in prior art systems, the subject system is more convenient and comfortable for drivers to completely release the sun screens (3) so as to prevent the direct rays of the sun from making the seats or the internal air temperature of the motor vehicle rise to an unacceptable comfort level.

We claim:

1. An automatic sun screen for a motor vehicle having an electrical system comprising:
   (a) an elongated longitudinally extended sun screen housing having a first and second chamber in open communication and axially displaced each with respect to the other;
   (b) means for reversibly displacing said sun screen, said means for reversibly displacing said sun screen including drive means located within said first and second chambers, said drive means including a motor coupled to a main drive shaft gear member mounted within said first chamber, said main drive shaft gear member in mating interface with a sun screen transmission shaft member extending axially through said second chamber and rotatably mounted within a ball bearing block mounted within one end of said sun screen housing;
   (c) a pair of spatially displaced spring plate members secured to said sun screen for maintaining said sun screen in a substantially planar contour when said sun screen is unrolled from said sun screen transmission sahft member;
   (d) a power plug member electrically coupled to said motor vehicle electrical system; and,
   (e) a switch member for reversibly actuating said motor and reversibly displacing displacing said sun screen.

2. The automatic sun screen as recited in claim 1 including a mounting block member secured to said sun screen housing and fixedly secured to an internal surface of said motor vehicle.

3. The automatic sun screen as recited in claim 1 including a spring clip member fixedly secured to said sun screen housing and releasably securable to a sun visor of said motor vehicle.

* * * * *